United States Patent
Murakami et al.

(10) Patent No.: US 6,836,045 B2
(45) Date of Patent: *Dec. 28, 2004

(54) ELECTRICAL MOTOR

(75) Inventors: Hiroshi Murakami, Suita (JP);
Yuichiro Sadanaga, Katano (JP);
Yasufumi Ikkai, Kobe (JP); Taro Kishibe, Nishinomiya (JP); Shinichiro Kawano, Daito (JP); Toshiyuki Tamamura, Kusatsu (JP); Haruhiko Kado, Moriyama (JP); Yukihiro Okada, Katano (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/412,927

(22) Filed: Apr. 14, 2003

(65) Prior Publication Data
US 2004/0150282 A1 Aug. 5, 2004

Related U.S. Application Data

(63) Continuation of application No. PCT/JP01/08629, filed on Oct. 1, 2001.

(30) Foreign Application Priority Data

Oct. 12, 2000 (JP) .................................. 2000-311591
Mar. 14, 2001 (JP) .................................. 2001-072244

(51) Int. Cl.$^7$ ............................ H02K 1/22; H02K 19/00
(52) U.S. Cl. .................... 310/156.53; 310/216; 310/168
(58) Field of Search .................. 310/156.53, 156.56, 310/156.57, 216, 261, 166–168

(56) References Cited

U.S. PATENT DOCUMENTS

| 4,924,130 | A | | 5/1990 | Fratta | 310/261 |
|---|---|---|---|---|---|
| 5,343,105 | A | * | 8/1994 | Sakabe et al. | 310/179 |
| 5,811,904 | A | * | 9/1998 | Tajima et al. | 310/156.45 |
| 5,903,080 | A | * | 5/1999 | Nashiki et al. | 310/168 |
| 6,034,460 | A | * | 3/2000 | Tajima et al. | 310/179 |
| 6,225,724 | B1 | * | 5/2001 | Toide et al. | 310/216 |
| 6,300,703 | B1 | * | 10/2001 | Kawano et al. | 310/261 |

FOREIGN PATENT DOCUMENTS

| JP | 9-168247 A | | 6/1997 | |
| JP | 9-219944 | * | 8/1997 | 310/156.53 |
| JP | 9-266646 | * | 10/1997 | 310/156.53 |
| JP | 10-150754 A | | 6/1998 | |
| JP | 11-89193 A | | 3/1999 | |
| JP | 2000-37052 | * | 2/2000 | 310/156.57 |
| JP | 2000-152538 | * | 5/2000 | 310/156.57 |
| JP | 2000-208313 A | | 7/2000 | |
| JP | 2000-253608 A | | 9/2000 | |

OTHER PUBLICATIONS

Yukio Honda, et al, "Development of Multi–Flux Barrier Type Synchronous Reluctance Motor", Mar. 10, 1996, pp. 5–41 & 5–42, 1996 National Convention Record, IEEE of Japan, No. 1029, with a partial English translation thereof.

* cited by examiner

Primary Examiner—Tran Nguyen
(74) Attorney, Agent, or Firm—Rossi & Associates

(57) ABSTRACT

An electric motor is equipped with a rotor having multiple rows of slits arranged along a radial direction. A permanent magnet is buried only in some of the slits, namely the ones closest to the center of the rotor or the innermost slits, to drive the motor using both magnet torque and reluctance torque. This improves the torque output.

27 Claims, 10 Drawing Sheets

W1=W2=W3=W4

Slits in two-layer

Slits in three-layer

Slits in four-layer

Slits in five-layer

W1=W2=W3=W4

W1<W2=W3=W4

W1< W2< W3< W4

ELECTRICAL MOTOR

This is a continuation of International Application PCT/JP01/08629 having an international filing date of 1 Oct. 2001; this International Application was not published in English, but in Japanese as WO 02/31947.

BACKGROUND

A reluctance motor, unlike an induction motor, produces no secondary copper-loss of its rotor. Because of this feature, the reluctance motor has been contemplated as a driving motor for electric vehicles and machine tools. However, the reluctance motor generally outputs low power, so that its rotor-core structure or driving method needs improvement before it can be put into practical use. Recently, a technique for increasing the power output has been developed. According to this technique, a multi-layered flux barrier is prepared on a core sheet of a rotor core, as disclosed in 1996 National Convention Record I.E.E. Japan, Item 1029, *Development of Multi-flux Barrier Type Synchronous Reluctance Motor* by Yukio Honda, et al.

FIGS. 12A–12C show a structure of a rotor-core of this conventional, but improved reluctance motor. In FIG. 12A, a disc-shaped core sheet 161 made from an electromagnetic steel sheet has a multi-slitted flux-barrier 162 having an inverse-arc configuration, with respect to an axis 163 of the core sheet 161. The flux-barrier 162 is made up of slits (through-slots) having approximately 1 mm width each (which can be formed by press working). Each slit has an end 164 that terminates within a given width inside its outer rim to strengthen the outer rim against centrifugal force applied thereto when the core sheet 161 spins.

Several tens of core sheets 161 are laminated along a rotor shaft 165, thereby completing a rotor core 166 as shown in FIG. 12B. Setting this rotor-core 166 in a stator 167 as shown in FIG. 12C causes a plurality of field-magnet sections 168 to impart a rotating magnetic field to the rotor core 166, thereby producing reluctance torque T, which can be expressed with the following equation:

$$T = Pn(Ld - Lq)idiq \quad (1),$$

where Pn is the number pairs of polarities, Ld and Lq are inductance of axis "d" and axis "q," and id and iq are axis "d" current and axis "q" current. Equation (1) indicates that the difference between axis-d inductance and axis-q inductance, i.e., Ld–Lq, determines the performance of the motor. The flux barrier is prepared so that this difference Ld–Lq can be increased. This flux barrier provides a magnetic path across the slits and running along axis "q" with resistance, while securing a magnetic path running along axis "d" between the slits.

The conventional structure drives the motor only with the reluctance torque, so that the driving torque generated by the motor is obliged to be small. In fact, as some products (compressor, refrigerator, air-conditioner) driven by those motors need a larger driving torque, the reluctance motor is not always suitable.

Accordingly, there is a need for a motor that can produce a larger driving torque, using not only reluctance torque, but also the magnetic torque. The present invention addresses this need.

SUMMARY OF THE INVENTION

The present invention relates to an electric motor and a compressor with such an electric motor. Accordingly one aspect of the present invention is the motor, which as a stator and a rotor. The rotor has multiple rows of slits arranged along a radial direction thereof. A magnetic flux route is formed along the rotor between each adjacent slits.

A permanent magnet can be disposed at each of selected slits or at least some of the slits to generate magnetic torque. The selected slits can be disposed closer or closest to the center of the rotor. In this respect, the selected slits can have a void at each end thereof. In other words, the slits can be configured to drive the rotor with magnet torque in addition to reluctance.

The slits can have the following configurations. The width of the magnetic flux route can be widest adjacent to the selected slits. Moreover, the width of a bridge formed between an end of the selected slits and an outer rim of the rotor can be narrower than the width of other bridges formed between the respective slits and the outer rim of the rotor. The widths of the bridges formed between the ends of the slits and an outer rim of the rotor can widen progressively from the selected slits toward the slits disposed closest to the outer rim of the rotor. Specifically, the width of the bridge of the selected slits can be narrowest, and the width of the bridge of the slits closest to the outer rim of the rotor can be widest.

Moreover, the width of the magnetic-flux route adjacent to the selected slits can be widest at an end of the magnetic-flux route, adjacent to the outer rim of the rotor. Further, the width of the selected slits can narrowest at an end thereof, adjacent to the outer rim of the rotor. The width of the slits adjacent to the selected slits can be narrowest at an end thereof, adjacent to the outer rim of the rotor.

The winding of the stator can be formed by a concentrated winding. The permanent magnet can be one of a ferrite magnet and a resin magnet. Moreover, the rotor can be composed of a plurality of core sheets laminated together along a rotating axis of the rotor, with the slits being shifted from one another to provide a skewed alignment of the slits. The selected slits can be positioned closest to the center of the rotor, and the number of rows of slits can be between 3–5, 4 being optimal.

Another aspect of the present invention is a compressor that includes the electric motor described above.

DETAILED DESCRIPTION

Exemplary embodiments of the present invention are demonstrated hereinafter with reference to the accompanying drawings. The embodiments below are only examples embodying the present invention, and they do not limit the technical scope of the present invention.

Figure 1:
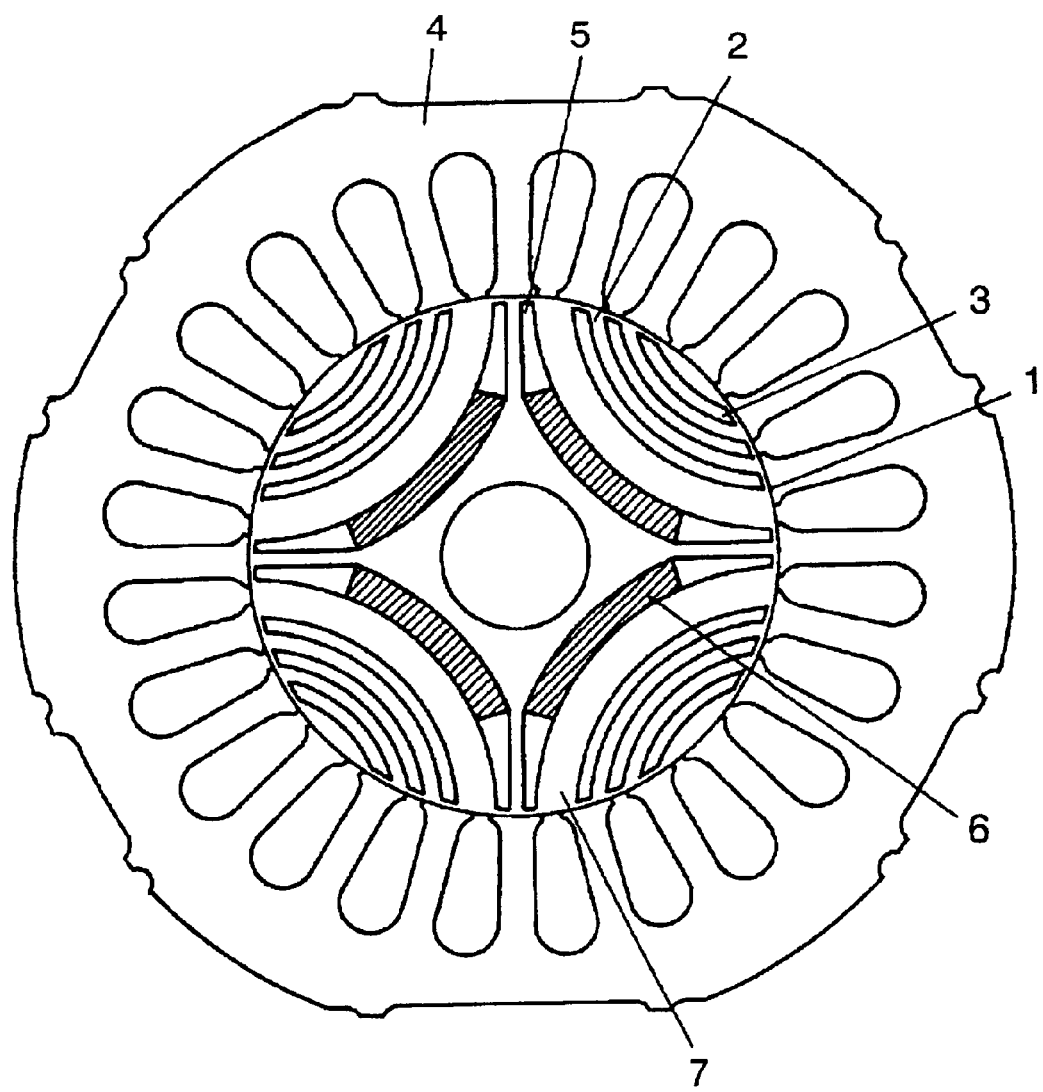
FIG. 1 shows a sectional view of a motor in accordance with an exemplary embodiment of the present invention.

FIG. 1 illustrates a first embodiment according to the present invention. In FIG. 1, a rotor core 1 is made by laminating disc-shaped core sheets made from the material of high magnetic permeability, such as electromagnetic steel sheets. Four arcing magnetic-flux routes 2 are bowed toward the core center across slits 3 in the radial direction and are arranged equidistantly or symmetrically in the circular direction. The core sheet can be formed by press working or laser-beam machining.

The shape of the magnetic-flux route or path 2 is preferably an arc in consideration of the shape of the magnetic paths and machining or working on the core-sheet. V-shape or I-shape instead of arc-shapes as shown in FIGS. 2A–2E are also acceptable. Several tens of the core sheets are laminated axially, then a rotor shaft is inserted into the laminated body, thereby completing a rotor core. The core sheets can be bonded with adhesive into one solid body if desired.

Setting this completed rotor core in a stator 4 causes a field-magnet section made up of plurality of teeth to provide the rotor-core with a rotating magnetic field, thereby producing reluctance torque. The stator 4 has a core section formed by a distributed winding method, so that the windings (not shown) stride over the teeth.

In a reluctance motor, including the foregoing rotor core, inductance running across the magnetic-flux route 2, along the axis "q" is compared with inductance "Ld" running parallel with the magnetic-flux route 2, along the axis "d." The comparison results in smaller inductance Lq along the axis "q" and greater inductance Ld along the axis "d." Because the slits 3 are formed of air space, where the magnetic permeability is approximately 0.001% that of an electromagnetic steel sheet, they provide resistance to the magnetic paths, so that less magnetic flux runs along the axis "q." On the other hand, the magnetic-flux route 2 forms magnetic paths that can flow with ease along the axis "d" so that inductance Ld becomes greater.

A feature of the first embodiment is to use the magnet torque in addition to the reluctance torque, thereby driving the motor. In order to realize this feature, a permanent magnet 6 is buried or positioned in the slits 5 located closest to the center, while leaving voids at both the ends of the slits 5, as illustrated in FIG. 1. Permanent magnets 6 generate magnetic flux, which can add magnet torque to the reluctance torque as a driving torque to increase the same.

In this case, the magnetic-flux routes 7 between the slits 5 closest to the center and the slits adjacent to them have a wider width than other magnetic-flux routes 2. Because the magnetic flux generated by the permanent magnets 6 is blocked by the slits 3 outside the permanent magnets 6, the flux flows into the magnetic-flux routes 7. The magnetic-flux routes are thus vulnerable to magnetic saturation because of not only the magnetic flux from the stator but also the magnetic flux from the permanent magnets run through the routes. To avoid magnetic saturation, the magnetic-flux routes are formed closest to the center with a wider width than other routes. As a result, the magnetic-flux routes are unlikely to encounter magnetic saturation.

Figure 2A:
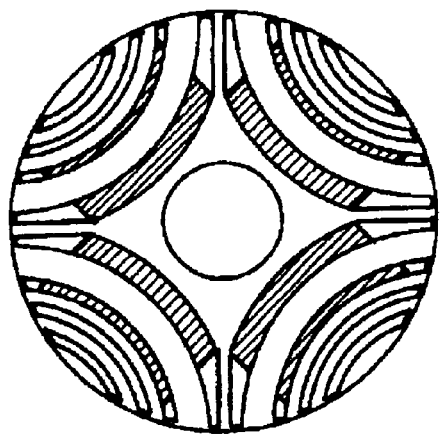
FIGS. 2A–2E show other shapes of rotor-core sheet.
Figure 2D:
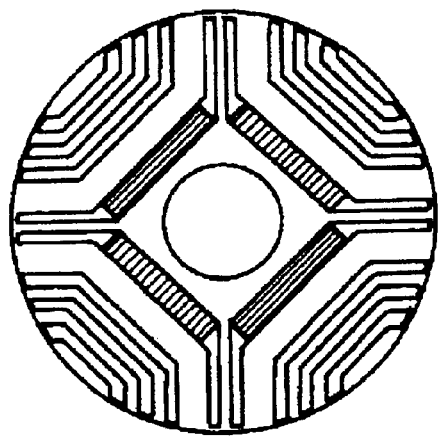
Figure 2B:
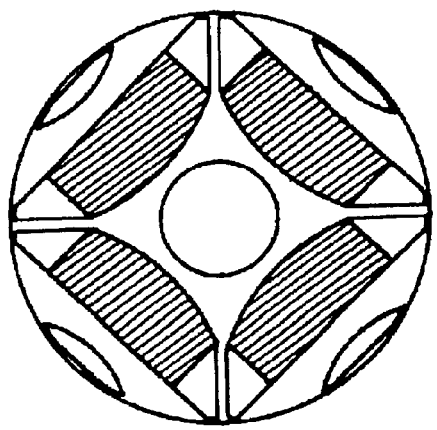
Figure 2E:
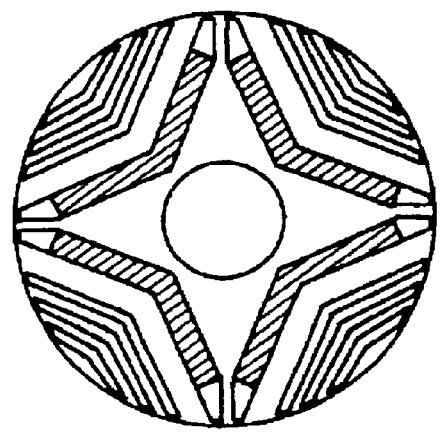
Figure 2C:
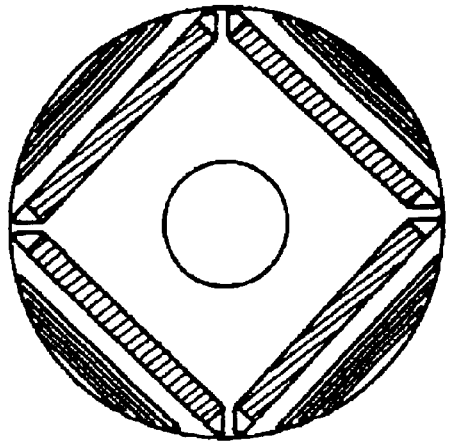

In the foregoing rotor, one permanent magnet is disposed in one row of slits per pole; however, plural rows can hold the magnets therein as shown in FIG. 2A. As shown in FIGS. 2B–2E, the slits and the magnetic-flux routes can be V-shaped or linearly shaped.

Figure 3A:
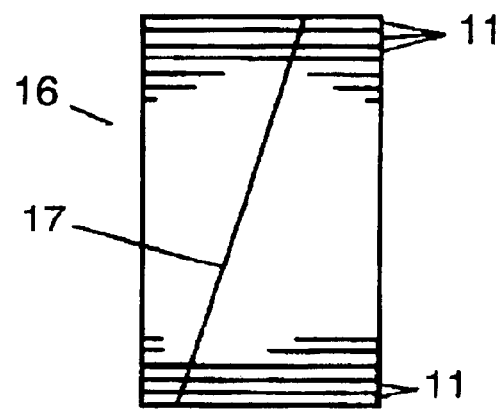
FIGS. 3A–3C show lateral views of skewed rotors.
Figure 3B:
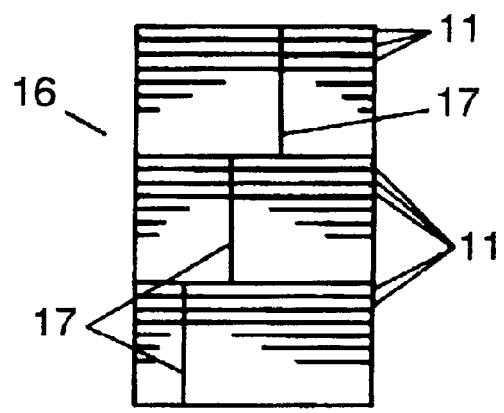
Figure 3C:
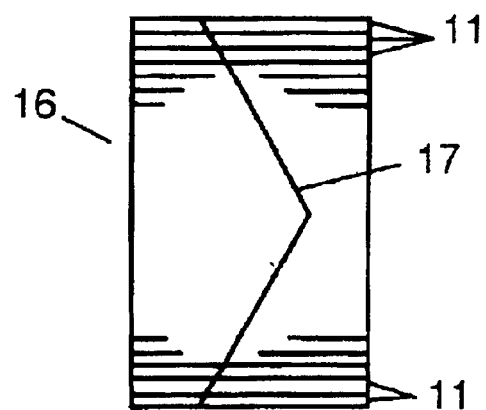

As shown in FIGS. 3A–3C, the rotor can be skewed, so that torque ripple due to uneven magnetic fluxes is reduced to further improve the performance of the motor. When plural core sheets are laminated, a mounting position of each core-sheet is shifted along the rotor shaft as shown in FIG. 3A, so that the rotor can be skewed 17. This structure allows the resistance against the magnetic path along axis "d" to be uniformed in the rim direction of the rotor, so that the magnetic flux along axis "d" entering rotor core 16 from the stator and going out from rotor-core 16 to the stator is uniformed. As a result, the torque ripple due to uneven magnetic flux can be reduced, and the performance of the motor can be improved.

Figure 4:
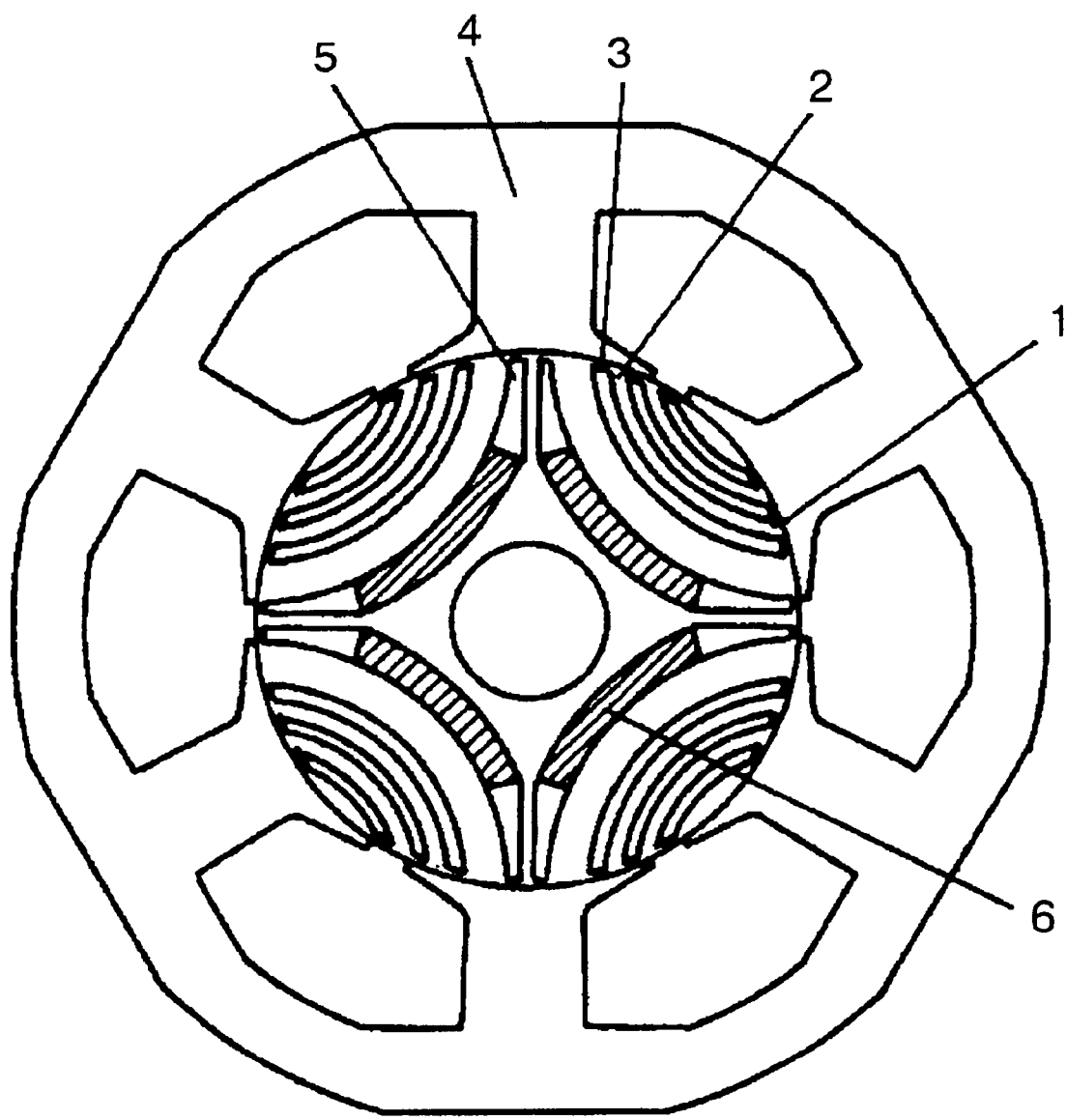
FIG. 4 shows a sectional view of a motor equipped with a stator having a concentrated winding.

In this case, the skew 17 can be stepped-shaped as shown in FIG. 3B, or can be bent at intermediate point along the rotor shaft to form a V shape as shown in FIG. 3C. The coil can be a concentrated winding as shown in FIG. 4 instead of the distributed winding.

Figure 5A:
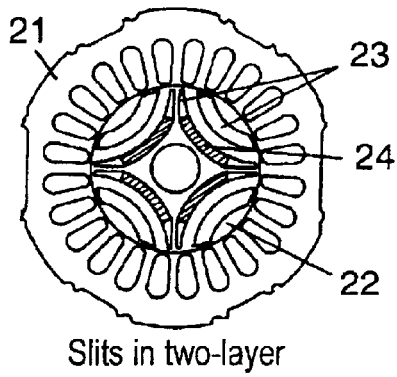
FIG. 5A shows a sectional view of a motor having two layers or rows of slits.
Figure 5B:
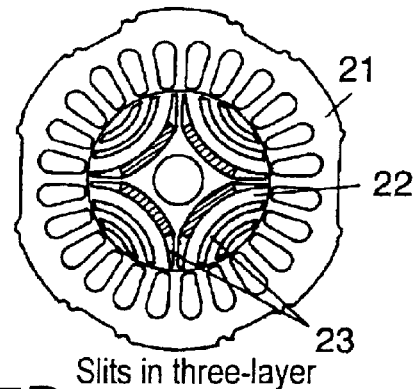
FIG. 5B shows a sectional view of a motor having three layers or rows of slits.
Figure 5C:
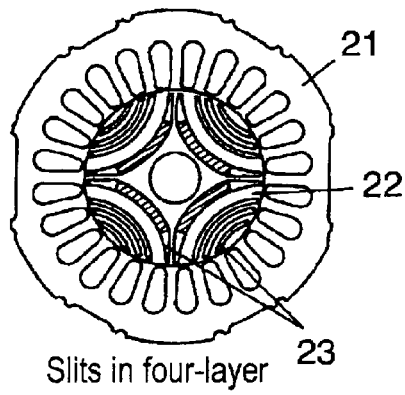
FIG. 5C shows a sectional view of a motor having four layers or rows of slits.
Figure 5D:
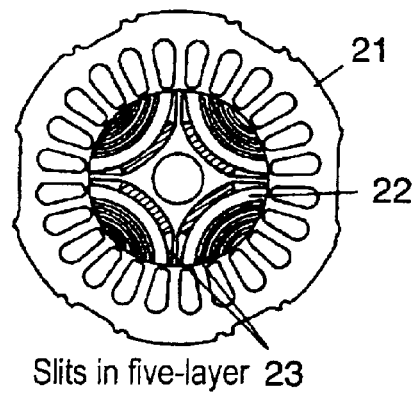
FIG. 5D shows a sectional view of a motor having five layers or rows of slits.

FIGS. 5A–5D illustrate a second exemplary embodiment according to the present invention. In FIGS. 5A–5D, the motor comprises a stator 21, a rotor 22, slits 23, and permanent magnets 24. FIGS. 5A–5D illustrate four kinds of rotors. FIG. 5A shows two rows of slits, FIG. 5B shows three rows of slits, FIG. 5C shows four rows of slits, and FIG. 5D shows five rows of slits. Although the magnets of these rotors have the same shape, the number of slit rows can be different between them.

Figure 6:
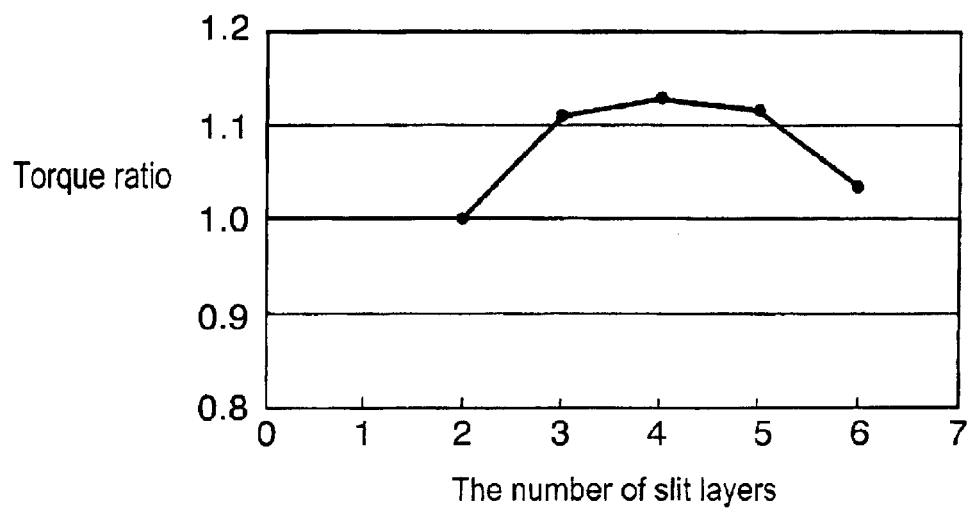
FIG. 6 shows a relation between the number of slit rows and a torque ratio.

FIG. 6 shows the torque ratios generated by the respective motors when an identical electric current is fed into the motors. The torque of the motor having two slit rows is used as a reference of the torque ratio. In FIG. 6, the axis X represents the numbers of slit rows raging from two to six, and the axis Y represents the relative torque ratio. FIG. 6 illustrates that 3–5 rows produce higher torque ratios, while 4 rows produces the highest. Therefore, it can be concluded that 3–5 slit-rows are suitable and 4 slit rows perform optimally among the rotors having the following structure: the rotor including multiple slits extending in the radial direction, while having permanent magnets disposed only in the slits closest to the center of the rotor.

Figure 7:
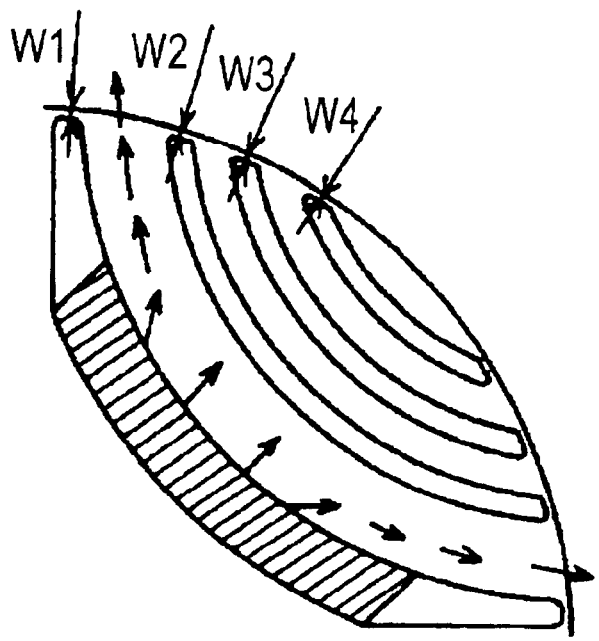
FIG. 7 shows an exemplary relationship between conventional bridge-widths and magnetic flux generated by an application of a permanent magnet according to the present invention.
Figure 8:
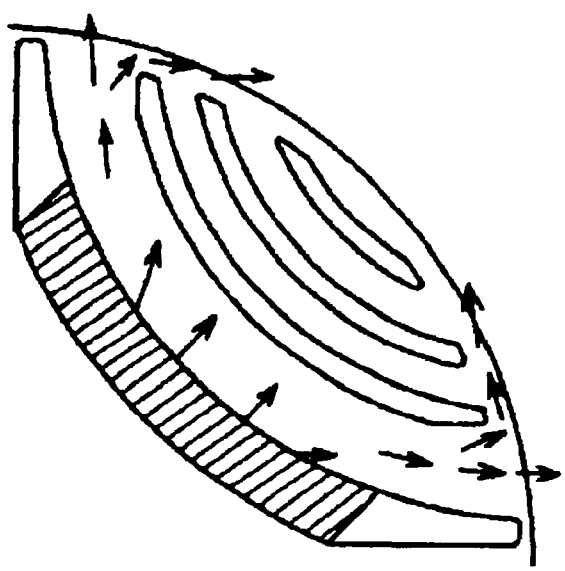
FIG. 8 shows a relation between bridge-widths and magnetic flux generated by a permanent magnet of a third exemplary embodiment.

FIG. 8 illustrates another exemplary embodiment according to the present invention. FIG. 7, which shows a motor structure for comparative purposes, illustrates the magnetic flux path if a permanent magnet is disposed in a slit closest to the center of the rotor when the bridges between slit ends and the outer rim of the rotor all have the same widths (W1=W2=W3=W4), as is configured in a conventional rotor structure. The bridge width is generally designed as narrow as possible so long as the strength of the rotor can be guaranteed. However, in the case of the present invention, where the permanent magnet is disposed in each of the innermost slits, the magnetic flux supplied from the magnet goes outside the rotor only through the path between the slit holding the magnet therein and the outer adjacent slit in the conventional rotor structure. This structure increases cogging torque and deforms induced-voltage waveforms.

As shown in FIG. 8, this exemplary embodiment widens the bridge widths W2, W3, and W4 so that W1<W2=W3=W4. This structure allows the magnetic flux supplied from the permanent magnet to run through at least one of the other bridges W2, W3, W4. Thus, a greater magnetic flux can be supplied from the magnet, and the rotor can supply a greater amount of magnetic flux to the stator, thereby reducing the cogging torque.

Figure 9:
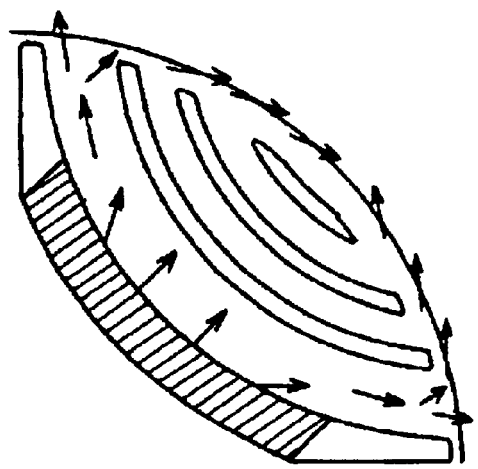
FIG. 9 shows another relation between bridge-widths and magnetic flux generated by a permanent magnet of the third exemplary embodiment.

As shown in FIG. 9, the bridge width can be widened progressively, i.e., step by step, from the inner slit to the outer slit, so that more magnetic flux can be supplied from the magnetic pole center. In other words, the bridge width can be as follows: W1<W2<W3<W4. This structure not only reduces cogging torque but also allows the induced voltage waveform to have a sine wave shape. As a result, a motor having less vibrations and lower noise can be obtained.

Figure 10:
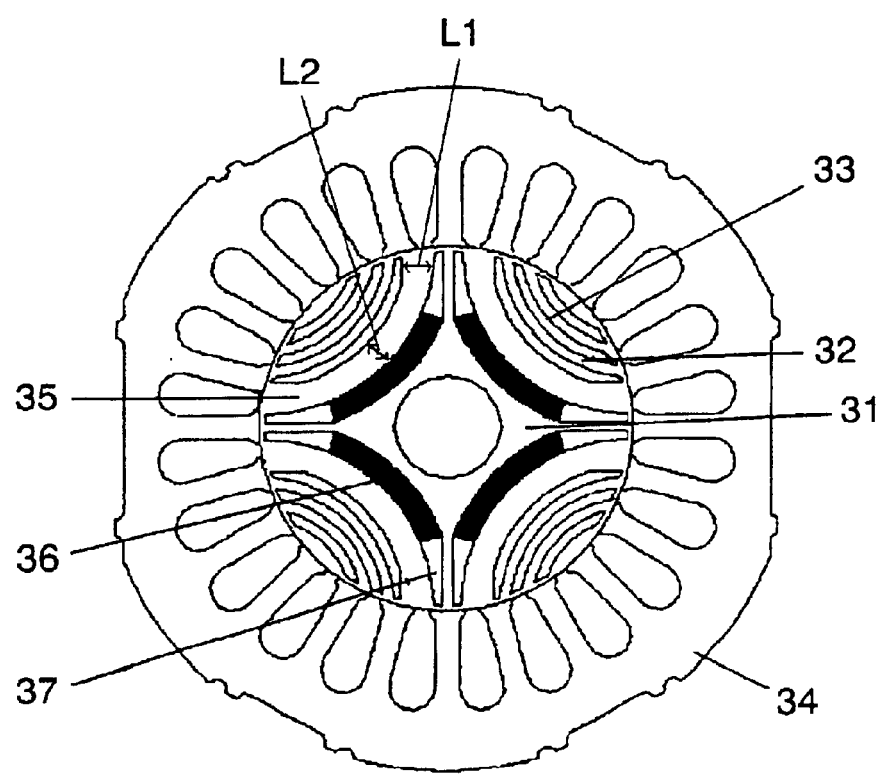
FIG. 10 shows a sectional view of a motor in accordance with a fourth exemplary embodiment of the present invention.
Figure 11:
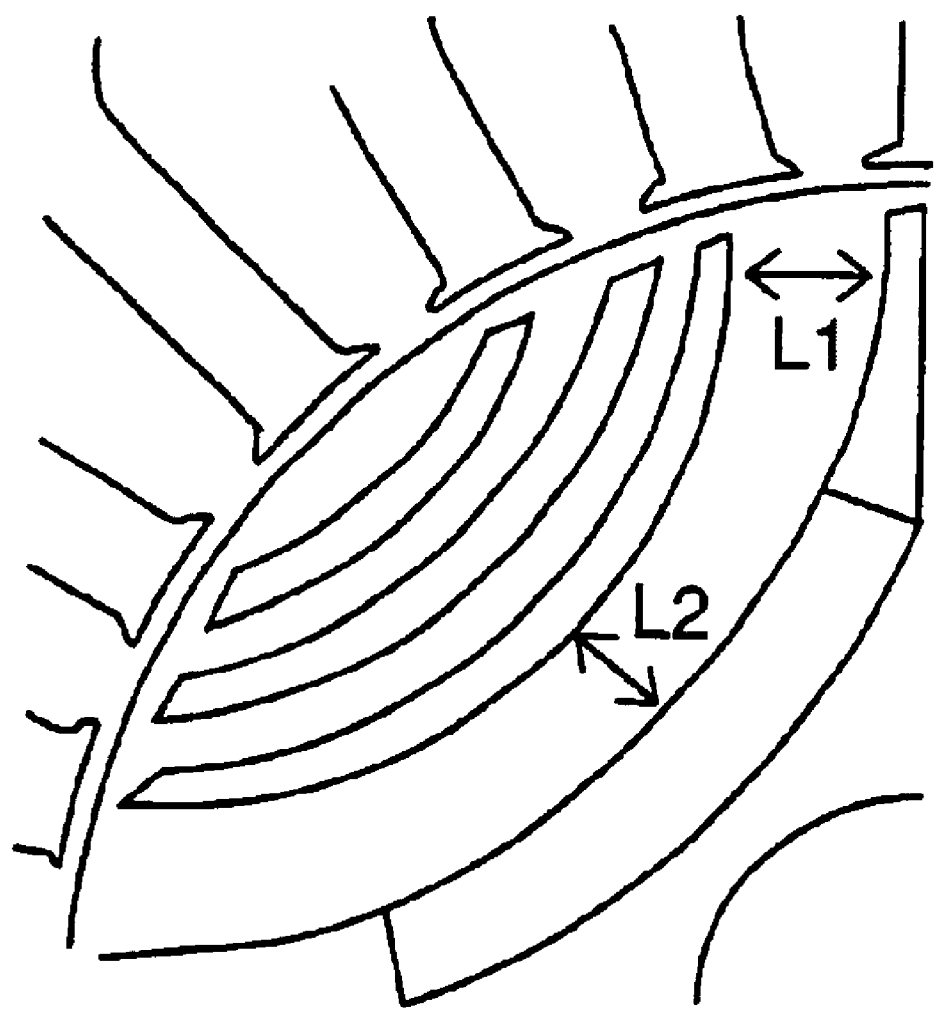
FIG. 11 shows an enlarged view of a part of a rotor core.
Figure 12A:
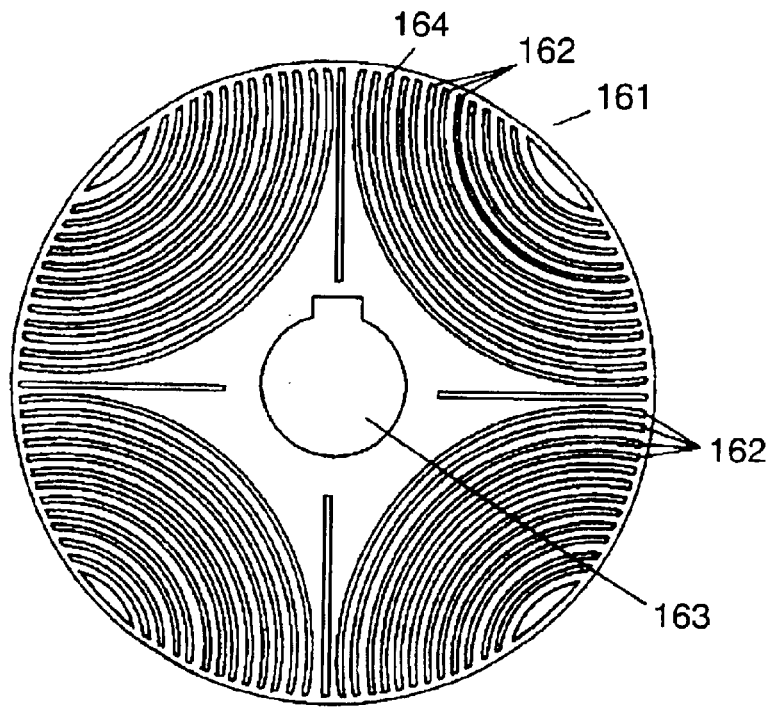
FIGS. 12A–12C illustrate a conventional rotor-core and motor.
Figure 12B:
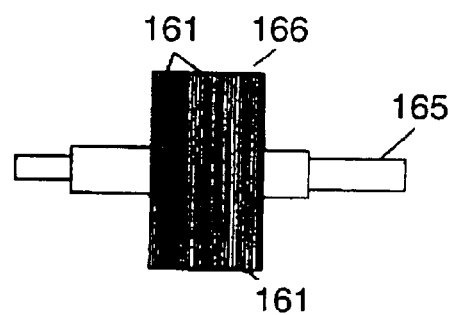
Figure 12C:
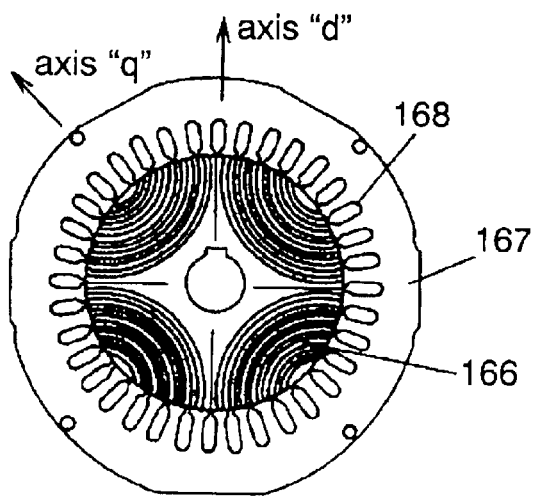

The fourth exemplary embodiment according to the present invention is illustrated in FIGS. 10 and 11. In FIG. 10, a rotor-core 31 is formed by laminating disc shaped core sheets made from material of a high magnetic permeability, such as an electromagnetic steel sheet. Four arcing magnetic-flux routes 32 are bowed toward the core-center across slits 33 in the radial direction and are arranged equidistantly or symmetrically in the circular direction. The core-sheet can be formed by press working or laser-beam machining. The shape of the magnetic-flux route 32 is preferably an arc in consideration of the shape of magnetic paths and machining or working on the core-sheet. The magnetic-flux route can also be V-shaped or I-shaped. Several tens of the core sheets are laminated axially, then a rotor shaft is inserted into the laminated body to complete a rotor-core. The core sheets can be bonded with adhesive into one solid body as desired.

Setting this completed rotor-core 31 in a stator 34 causes a field-magnet section made up of plural teeth of the stator to provide the rotor-core with rotating magnetic field, thereby producing reluctance torque. The stator 34 has a core section formed by a distributed winding method, so that the windings (not shown) stride over the teeth.

In a reluctance motor, including the foregoing rotor core, inductance "Lq" running across the magnetic-flux route 32 along the axis "q" is compared with inductance "Ld" running parallel with the magnetic-flux route 32 along the axis "d". The comparison results in a smaller inductance Lq along the axis "q" and a greater inductance Ld along the axis "d." Because the slits 33 are formed of air space, where the magnetic permeability is approximately 0.001% that of electromagnetic steel sheet, they provide the magnetic paths with resistance, so that less magnetic flux runs along the axis "q." On the other hand, the magnetic-flux route 32 forms magnetic paths, and the magnetic-flux can flow with ease, so that inductance Ld becomes greater.

A feature of the fourth embodiment is to use magnet torque in addition to reluctance torque for driving the motor. In order to realize this feature, a permanent magnet 36 is disposed in each slit 37 located closest to the center of the rotor, while leaving voids at both the ends of the slits 37. The permanent magnets 36 generate magnetic flux, which can add magnet torque to the reluctance torque as driving torque, so that the driving torque of the motor can be increased.

In this case, the magnetic-flux routes 35 between the slits 37 closest to the center and the slits adjacent to them are wider than the other magnetic-flux routes 35. Because the magnetic flux generated by the permanent magnets 36 are blocked by the slits 33 outside the permanent magnets 36, the flux flows into the magnetic-flux routes 35. The magnetic-flux routes are thus vulnerable to magnetic saturation because of not only the magnetic flux from the stator but also the magnetic flux from the permanent magnets run through the routes. This is the reason why the magnetic-flux routes closest to the center are equipped with a wider width than other routes. As a result, the magnetic-flux route is less likely to encounter magnetic saturation.

Further, referring to FIG. 11, the width of the magnetic-flux routes 35 between slit 37 (holding the permanent magnet therein and being closest to the center) and the adjacent slit is wider at the end (L1) on the outer rim side of the rotor than at other parts (L2). This structure allows the magnetic flux on the surface of the rotor to be distributed smoothly and reduces the cogging torque.

In the rotor according to the fourth embodiment, one permanent magnet is disposed in one row of slits per pole; however, plural rows can hold the magnets therein. The slits and magnetic-flux route can be V-shaped or linear-shaped. The rotor can be skewed, so that torque ripple due to uneven magnetic fluxes is reduced, thereby further improving the performance of the motor. The coil of the stator can be formed by a concentrated winding method.

The electrical motor according to the present invention has permanent magnets disposed in the slits near the core center. If the permanent magnets are buried in the outer-most slits, the magnets are placed farthest from the core center and receive a greater centrifugal force, so that a large load is applied to the rotor. Therefore, it is desirable to dispose the permanent magnets only in the innermost slits.

Figure 13:
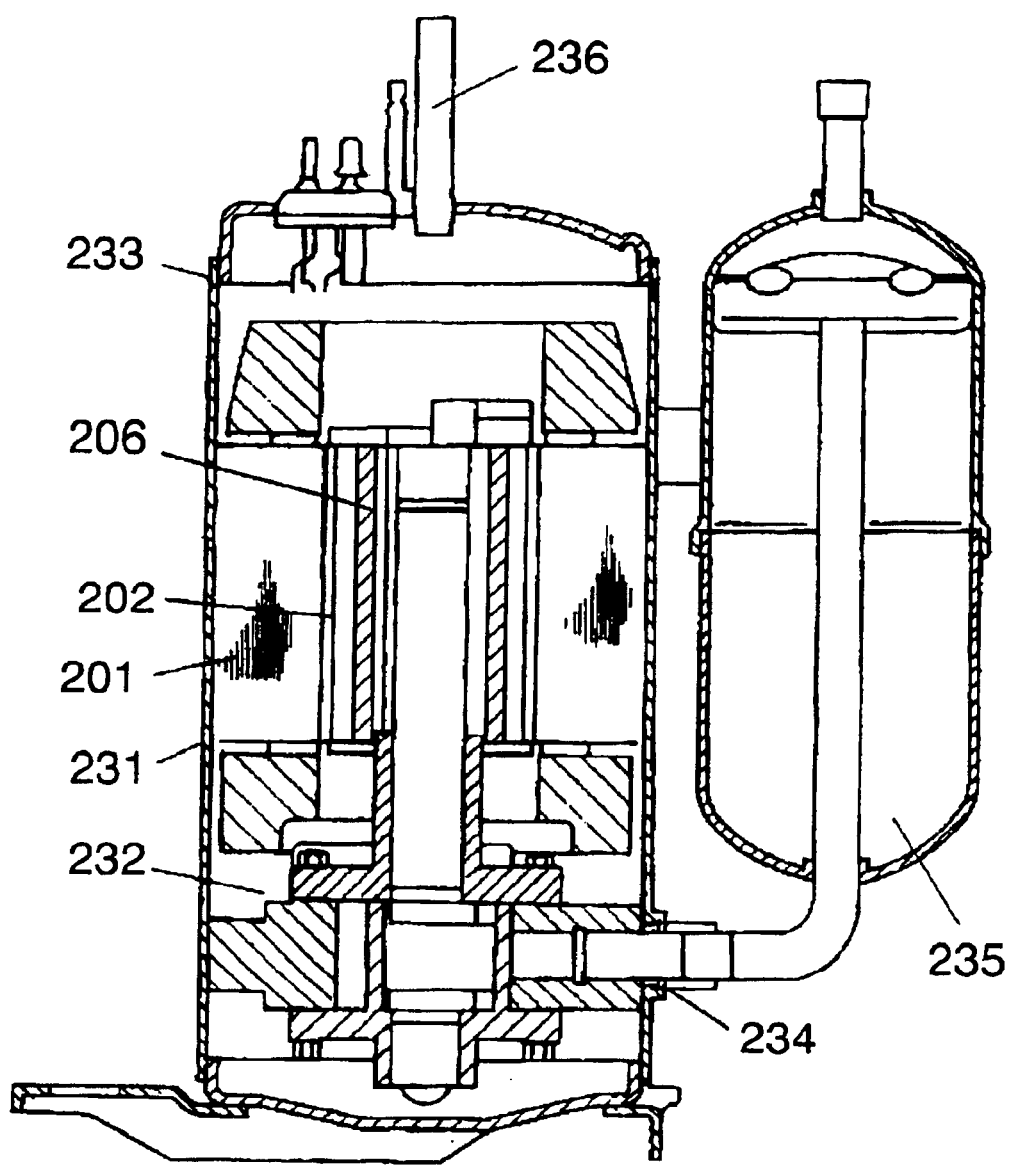
FIG. 13 illustrates a compressor usable in air conditioners or electric refrigerators.

The motors exemplified in the previous embodiments can be used in a driving section of compressors used in refrigerators and air-conditioners. In this regard, FIG. 13 illustrates a compressor that can be used in refrigerators and air-conditioners. The compressor uses a motor 231, which has a stator 201, a rotor 202, and permanent magnet 206 buried or positioned in the rotor, as previously discussed in the exemplary embodiments. The motor 231 and compressing section 232 are place in a closed container 233. The compressing section 232 has suction tube 234 equipped with an accumulator 235. A protruding tube 236 is disposed at an upper section of closed container 233. The compressor according to the present invention can fully take advantages disclosed herein.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications, JP 2001-72244, JP 2000-311591, and PCT/JP01/08629, in their entirety, including the drawings, claims, and the specification thereof, are incorporated herein by reference.

What is claimed is:

1. An electric motor comprising:

a stator; and a rotor having multiple rows of slits arranged along a radial direction thereof, wherein a permanent magnet is positioned in each of selected slits, which are disposed closer to a center of the rotor, to drive the rotor with magnet torque and reluctance torque, and wherein a magnetic flux route is formed along the rotor between each adjacent slits, and a width of the magnetic flux route is widest adjacent to the selected slits.

2. The motor of claim 1, wherein a winding of the stator is formed by a concentrated winding.

3. The motor of claim 1, wherein the permanent magnet is one of a ferrite magnet and a resin magnet.

4. The motor of claim 1, wherein the rotor is composed of a plurality of core sheets laminated together along a rotating axis of the rotor, with the slits being shifted from one another to provide a skewed alignment of the slits.

5. The motor of claim 1, wherein the selected slits are positioned closest to the center of the rotor and the number of rows of slits is 3–5.

6. The motor of claim 1, wherein the selected slits are positioned closest to the center of the rotor and the number of rows of slits is 4.

7. The motor of claim 6, wherein a width of a bridge formed between an end of the selected slits and an outer rim of the rotor is narrower than a width of other bridges formed between the respective slits and the outer rim of the rotor.

8. The motor of claim 1, wherein a width of a bridge formed between an end of the selected slits and an outer rim of the rotor is narrower than a width of other bridges formed between the respective slits and the outer rim of the rotor.

9. The motor of claim 1, wherein widths of bridges formed between ends of the slits and an outer rim of the rotor widen progressively from the selected slits toward the slits disposed closest to the outer rim of the rotor.

10. The motor of claim 9, wherein the width of the bridge of the selected slits is narrowest, and the width of the bridge of the slits closest to the outer rim of the rotor is widest.

11. The motor of claim 1, wherein a width of the magnetic-flux route adjacent to the selected slits is widest at an end of the magnetic-flux route, adjacent to the outer rim of the rotor.

12. The motor of claim 11, wherein a width of the selected slits is narrowest at an end thereof, adjacent to the outer rim of the rotor.

13. The motor of claim 11, wherein a width of the slits adjacent to the selected slits is narrowest at an end thereof, adjacent to the outer rim of the rotor.

14. An electric motor comprising:

a stator; and a rotor having multiple rows of slits arranged along a radial direction thereof, wherein a permanent magnet is positioned at each of selected slits, which are configured to drive the rotor with magnet torque in addition to reluctance torque, and wherein the selected slits have a void at each end thereof.

15. The motor of claim 14, wherein a winding of the stator is formed by a concentrated winding.

16. The motor of claim 14, wherein the permanent magnet is one of a ferrite magnet and a resin magnet.

17. The motor of claim 14, wherein the rotor is composed of a plurality of core sheets laminated together along a rotating axis of the rotor, with the slits being shifted from one another to provide a skewed alignment of the slits.

18. The motor of claim 14, wherein the selected slits are positioned closest to a center of the rotor, and the number of rows of slits is 3–5.

19. The motor of claim 14, wherein the selected slits are positioned closest to a center of the rotor, and the number of rows of slits is 4.

20. The motor of claim 19, wherein a width of a bridge formed between an end of the selected slits and an outer rim of the rotor is narrower than a width of other bridges formed between the respective slits and the outer rim of the rotor.

21. The motor of claim 14, wherein a width of a bridge formed between an end of the selected slits and an outer rim of the rotor is narrower than a width of other bridges formed between the respective slits and the outer rim of the rotor.

22. The motor of claim 14, wherein widths of bridges formed between ends of the slits, and an outer rim of the rotor widen progressively from the selected slits toward the slits disposed closest to the outer rim of the rotor.

23. The motor of claim 22, wherein the width of the bridge of the selected slits is narrowest, and the width of the bridge of the slits closest to the outer rim of the rotor is widest.

24. The motor of claim 14, wherein a width of the magnetic-flux route adjacent to the selected slits is widest at an end of the magnetic-flux route, adjacent to the outer rim of the rotor.

25. The motor of claim 24, wherein a width of the selected slits is narrowest at an end thereof, adjacent to the outer rim of the rotor.

26. The motor of claim 24, wherein a width of the slits adjacent to the selected slits is narrowest at an end thereof, adjacent to the outer rim of the rotor.

27. A compressor having an electric motor driven by magnet torque in addition to reluctance torque, the electric motor comprising:

a stator; and a rotor having multiple rows of slits arranged along a radial direction thereof, wherein a permanent magnet is positioned in each of selected slits, which are disposed closer to a center of the rotor, to drive the rotor with magnet torque and reluctance torque, and wherein a magnetic flux route is formed along the rotor between each adjacent slits, and a width of the magnetic flux route is widest adjacent to the selected slits.

* * * * *